US012700122B2

(12) United States Patent
Liu et al.

(10) Patent No.: US 12,700,122 B2
(45) Date of Patent: Aug. 4, 2026

(54) ELECTRONIC DEVICE AND METHOD WITH POSE PREDICTION

(71) Applicant: SAMSUNG ELECTRONICS CO., LTD., Suwon-si (KR)

(72) Inventors: Zhihua Liu, Beijing (CN); Paul Oh, Suwon-si (KR); Qiang Wang, Beijing (CN); Yamin Mao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 18/363,798

(22) Filed: Aug. 2, 2023

(65) Prior Publication Data

US 2024/0046505 A1 Feb. 8, 2024

(30) Foreign Application Priority Data

Aug. 5, 2022 (CN) .......................... 202210939800.4
Apr. 7, 2023 (KR) ........................ 10-2023-0045982

(51) Int. Cl.
*G06T 7/70* (2017.01)
*G06V 10/77* (2022.01)
*G06V 10/82* (2022.01)

(52) U.S. Cl.
CPC ............ *G06T 7/70* (2017.01); *G06V 10/7715* (2022.01); *G06V 10/82* (2022.01)

(58) Field of Classification Search
CPC ......... G06T 7/70; G06T 7/73; G06V 10/7715; G06V 10/82; G06V 20/64; G06V 40/113
USPC ....................................................... 382/100
See application file for complete search history.

(56) References Cited

U.S. PATENT DOCUMENTS

2020/0184721 A1 6/2020 Ge et al.

FOREIGN PATENT DOCUMENTS

| CN | 104636725 B | | 9/2017 | |
|----|-------------|---|--------|---|
| CN | 111191627 B | | 2/2022 | |
| CN | 108776773 B | | 3/2022 | |
| CN | 114648702 | * | 6/2022 | .......... G06F 18/253 |
| CN | 114764870 | * | 7/2022 | .......... G06F 18/2411 |

OTHER PUBLICATIONS

Lin, et al. "End-to-end human pose and mesh reconstruction with transformers." *Proceedings of the IEEE/CVF conference on computer vision and pattern recognition*. 2021. pp. 1954-1963.
Cheng, et al. "Swin-depth: Using transformers and multi-scale fusion for monocular-based depth estimation." *IEEE Sensors Journal* vol. 21, No. 23 (Dec. 1, 2021): pp. 26912- 26920.
Cheng, et al. "Swin-depth: Using transformers and multi-scale fusion for monocular-based depth estimation." *IEEE Sensors Journal* vol. 21, No. 23 (Jun. 25, 2022): pp. 26912-26920.
Xiong, Fu, et al. "A2j: Anchor-to-joint regression network for 3d articulated pose estimation from a single depth image." *Proceedings of the IEEE/CVF International Conference on Computer Vision*. 2019. pp. 793-802.

* cited by examiner

*Primary Examiner* — Jerome Grant, II

(74) *Attorney, Agent, or Firm* — NSIP Law

(57) ABSTRACT

An electronic device for predicting a pose and a method of operating the electronic device are provided. The method includes extracting a feature map from an input image, predicting coordinates of a joint point from the feature map using an ordinal regression model, and predicting a pose of an object using the predicted coordinates of the joint point.

19 Claims, 15 Drawing Sheets

Depth image
301 x-coordinate image
303 y-coordinate image
305

Input image
307
HxWx3

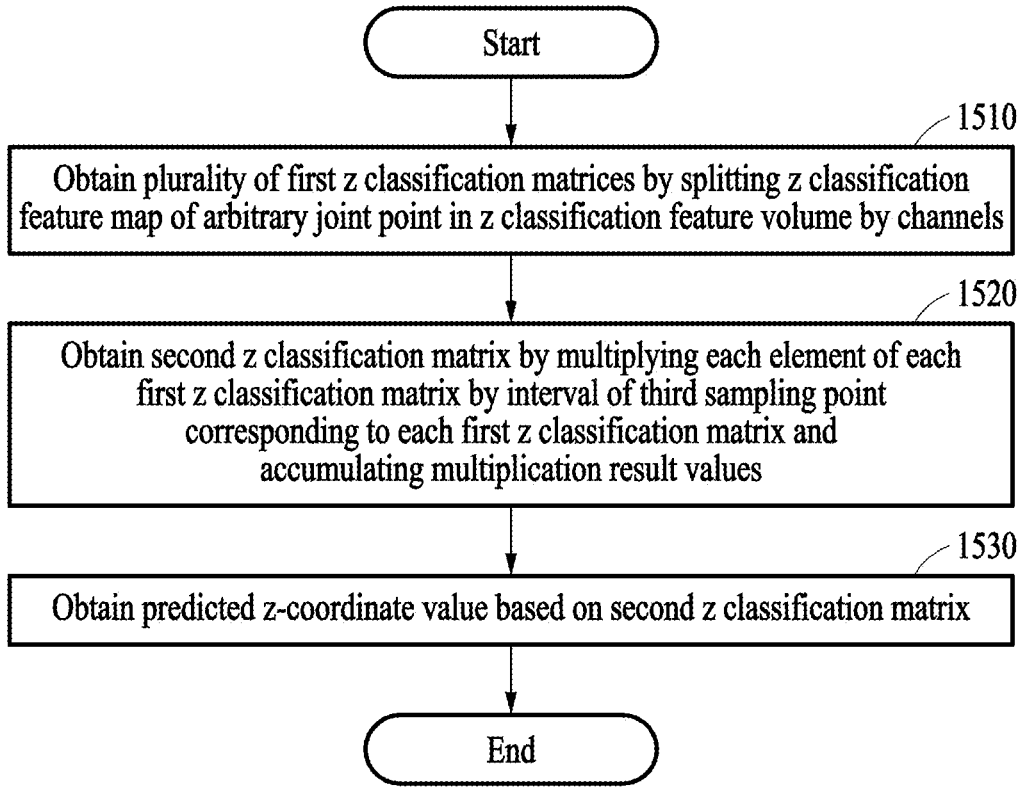

Start

1510

Obtain plurality of first z classification matrices by splitting z classification feature map of arbitrary joint point in z classification feature volume by channels

1520

Obtain second z classification matrix by multiplying each element of each first z classification matrix by interval of third sampling point corresponding to each first z classification matrix and accumulating multiplication result values

1530

Obtain predicted z-coordinate value based on second z classification matrix

End

ELECTRONIC DEVICE AND METHOD WITH POSE PREDICTION

CROSS-REFERENCE TO RELATED APPLICATIONS

This application claims the benefit under 35 USC § 119(a) of Chinese Patent Application No. 202210939800.4 filed on Aug. 5, 2022, in the China National Intellectual Property Administration, and Korean Patent Application No. 10-2023-0045982 filed on Apr. 7, 2023, in the Korean Intellectual Property Office, the entire disclosures of which are incorporated herein by reference for all purposes.

BACKGROUND

1. Field

The following description relates to an electronic device and method with pose prediction.

2. Description of Related Art

A human-computer interaction may be a way of exchanging information between a human and a computer. Gesture recognition, which is an intuitive interaction scheme, may a key technology for human-computer interaction.

Hand pose estimation in space may be the central to gesture recognition. Hand pose estimation tasks may be broadly divided into two categories in terms of input modes. One may be an input mode based on a red, green, and blue (RGB) color image, and the other may be an input mode based on a depth image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating an electronic device includes: extracting a feature map from an input image; predicting coordinates of a joint point from the feature map using an ordinal regression model, the joint point corresponding to a point of a joint of an object; and predicting a pose of the object using the predicted coordinates of the joint point.

The method may further include generating the input image based on a depth image of the object, wherein the generating of the input image includes generating an x-coordinate image with respect to a width of the depth image and generating a y-coordinate image with respect to a height of the depth image.

The extracting of the feature map may include: inputting the input image to a transformer; and extracting from the input image, by the transformer, a first feature map that may be an intermediate output of the transformer and a second feature map that may be a final output of the transformer.

The predicting of the coordinates of the joint point from the feature map may include: generating classification feature volumes from the first feature map and the second feature map using the ordinal regression model; and predicting the coordinates based on the classification feature volumes using the ordinal regression model.

Multiple joint points, including the joint point, may be predicted based on the input image, and the generating of the classification feature volumes may include: generating an x classification feature volume and a y classification feature volume for each of the joint points based on the first feature map; and generating a z classification feature volume for each of the joint points based on the second feature map.

The generating of an x classification feature volume and a y classification feature volume for each joint point may include: obtaining first sampling points and second sampling points by performing discretized sampling on a width dimension and on a height dimension of the input image, respectively; and generating the x classification feature volume based on x-coordinates of the first sampling points and generating the y classification feature volume based on y-coordinates of the second sampling points.

The generating of the z classification feature volume may include: obtaining third sampling points by performing discretized sampling on a depth dimension of the input image; and generating the z classification feature volume based on z-coordinates of the third sampling points.

The predicting of the coordinates of the joint point from the feature map may include obtaining a predicted x-coordinate value, a predicted y-coordinate value, and a predicted z-coordinate value of the joint point, based on the x classification feature volume, the y classification feature volume, and the z classification feature volume, respectively.

The obtaining of the predicted x-coordinate value, the predicted y-coordinate value, and the predicted z-coordinate value may include: obtaining first x classification column vectors by column-wise splitting an x classification feature map of an arbitrary joint point in the x classification feature volume; obtaining a second x classification column vector by multiplying each element of each of the first x classification column vectors by an interval of a first sampling point and by accumulating result values of the multiplying; and obtaining the predicted x-coordinate value based on the second x classification column vector.

Each element of each of the first x classification column vectors may represent a respective probability of an x-coordinate thereof being greater than an x-coordinate of a first sampling point corresponding to each element when the joint point is at a pixel point corresponding to a y-coordinate of each element.

The obtaining of the predicted x-coordinate value, the predicted y-coordinate value, and the predicted z-coordinate value may include: obtaining first y classification row vectors by row-wise splitting a y classification feature map of an arbitrary joint point in the y classification feature volume; obtaining a second y classification row vector by multiplying each element of each of the first y classification row vectors by an interval of a second sampling point and by accumulating result values of the multiplying; and obtaining the predicted y-coordinate value based on the second y classification row vector.

Each element of each of the first y classification row vectors may represent a respective probability of a y-coordinate thereof being greater than a y-coordinate of a second sampling point corresponding to each element when the joint point is at a pixel point corresponding to an x-coordinate of each element.

The obtaining of the predicted x-coordinate value, the predicted y-coordinate value, and the predicted z-coordinate value may include: obtaining first z classification matrices by splitting a z classification feature map in the z classification feature volume by channels; obtaining a second z classification matrix by multiplying each element of each of the first z classification matrices by an interval of a third sampling point and by accumulating result values of the multiplying; and obtaining the predicted z-coordinate value based on the second z classification matrix.

Each element of each of the first z classification matrices represents a respective probability of a z-coordinate thereof being greater than a z-coordinate of a third sampling point corresponding to each element when the joint point is at a pixel point corresponding to each element.

In another general aspect, a method of operating an electronic device includes: extracting a feature map from an input image using a transformer; generating, by an ordinal regression model, from the feature map, classification feature volumes, wherein the classification feature volumes are an intermediate output of the ordinal regression model; predicting, based on the classification feature volumes, coordinates of a joint point, wherein the predicted coordinates are an output of the ordinal regression model; and predicting a pose of an object using the predicted coordinates of the joint point.

The predicted coordinates may be a final output of the ordinal regression model.

In another general aspect, an electronic device includes: a processor configured to extract a feature map from an input image, predict coordinates of a joint point from the feature map using an ordinal regression model, and predict a pose of an object using the predicted coordinates of the joint point.

The processor may be further configured to form the input image based on a depth image of the object, and the processor may be further configured to: generate an x-coordinate image normalized by a width of the depth image, generate a y-coordinate image normalized by a height of the depth image, and form the input image to include the x-coordinate image, the y-coordinate image, and the depth image.

The processor may be further configured to: input the input image to a transformer; and extract, by the transformer, from the input image, a first feature map and a second feature map.

The processor may be further configured to generate classification feature volumes from the first feature map and the second feature map using the ordinal regression model, and to predict the coordinates based on the classification feature volumes using the ordinal regression model.

Other features and aspects will be apparent from the following detailed description, the drawings, and the claims.

BRIEF DESCRIPTION OF THE DRAWINGS

FIGS. 14 and 15 illustrate an example of obtaining a predicted z-coordinate value from a z classification feature volume, according to one or more embodiments.

Figure 1:
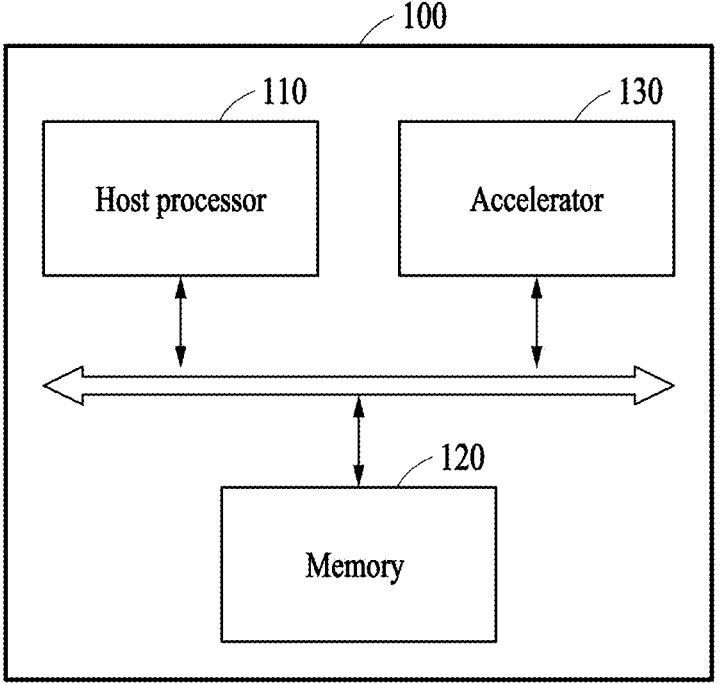
FIG. 1 illustrates an example electronic device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example electronic device, according to one or more embodiments.

Referring to FIG. 1, an electronic device 100 may include a host processor 110, a memory 120, and an accelerator 130. The host processor 110, the memory 120, and the accelerator 130 may communicate with each other through a bus, a network on a chip (NoC), a peripheral component interconnect express (PCIe), and the like. In the example of FIG. 1, only components related to examples described herein are illustrated in the electronic device 100. The electronic device 100 may also include other general-purpose components in addition to the components illustrated in FIG. 1.

The host processor 110 may perform an overall function for controlling the electronic device 100. The host processor 110 may generally control the electronic device 100 by executing programs and/or instructions stored in the memory 120. The host processor 110 may be implemented as a central processing unit (CPU), a graphics processing unit (GPU), an application processor (AP), and the like, which are included in the electronic device 100, however, examples are not limited thereto. The host processor 110 may execute an operating system stored in the memory 120.

The memory 120 may be hardware for storing data processed in the electronic device 100 and data to be processed. In addition, the memory 120 may store an application, a driver, and the like to be driven by the electronic device 100. The memory 120 may include a volatile memory (e.g., dynamic random-access memory (DRAM)) and/or a nonvolatile memory.

The electronic device 100 may include the accelerator 130 for an operation. The accelerator 130 may process tasks that may be more efficiently processed by a separate exclusive processor (e.g., the accelerator 130), than by the host processor 110 used for general purposes, due to characteristics of operations. Here, one or more processing elements (Pes) included in the accelerator 130 may be utilized. The accelerator 130 may be, for example, a neural processing unit (NPU), a tensor processing unit (TPU), a digital signal processor (DSP), a GPU, a neural engine, and the like that may perform an operation related to a neural network.

A processor described below may be implemented as the accelerator 130, however, examples are not limited thereto. The processor may also be implemented as the host processor 110.

The processor may predict a pose of an object. The processor may predict the pose of the object using an input image including a depth image. To do so, the processor may extract a feature map from the input image. The processor may predict coordinates of a joint point based on the feature map (here, "joint point" refers to a point of a joint of the object). When at least two joint points are present, the processor may predict the at least two joint points. The processor may predict the pose of the object using the predicted coordinates of the joint point. Methods by which the processor may predict a pose of an object are described in detail below.

Figure 2:
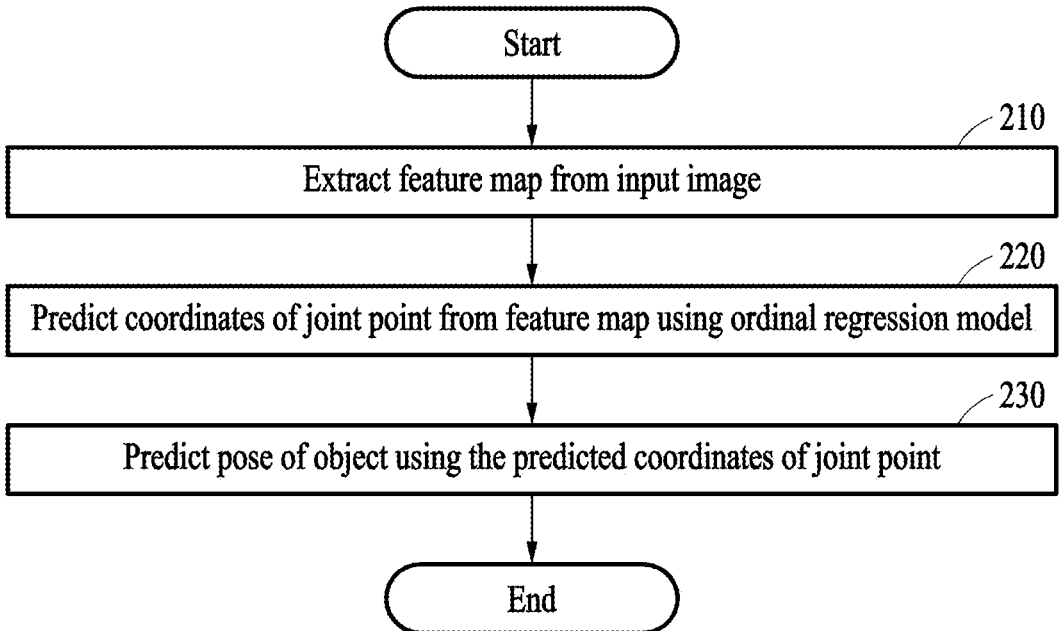
FIG. 2 illustrates an example method of operating an electronic device, according to one or more embodiments.

FIG. 2 illustrates an example method of operating an electronic device, according to one or more embodiments.

In operation 210, a processor may extract a feature map from an input image. The input image may include a depth image as well as an x-coordinate image and a y-coordinate image that are normalized based on the depth image. The input image is described in detail with reference to FIG. 3.

The processor may extract the feature map by inputting the input image to a transformer. A method of extracting a feature map is described in detail with reference to FIG. 4.

In operation 220, the processor may predict coordinates of a joint point from the feature map using an ordinal regression model.

The processor may input the coordinates of the joint point by inputting the feature map to the ordinal regression model. The ordinal regression model may generate classification feature volumes as intermediate outputs, using the feature map. The ordinal regression model may predict coordinates of a joint point based on the classification feature volumes. The coordinates of the joint point may include an x-coordinate, a y-coordinate, and a z-coordinate. An example in which the processor predicts coordinates of a joint point is described in detail with reference to FIGS. 7 to 14. For example, at least one joint point may be provided.

In operation 230, the processor may predict a pose of an object using the predicted coordinates of the joint point.

The number of joint points of an object may remain generally constant. For example, the number of joint points in a hand may remain constant. In this example, if coordinates of each joint point are identified, a pose of the hand may be predicted based thereon.

The object may be, for example, a hand, a body, and the like (i.e., any jointed structure such as a robot, an animal or appendage thereof, etc.). Hereinafter, for convenience of description, method of predicting a pose are described based on an example of predicting a pose of a hand. However, the present disclosure is not limited thereto.

Methods of pose prediction described herein may be robust against large noise, an unclear edge, and/or a low resolution of a depth image obtained by a depth sensor, and may possibly enhance the accuracy of pose prediction.

Figure 3:
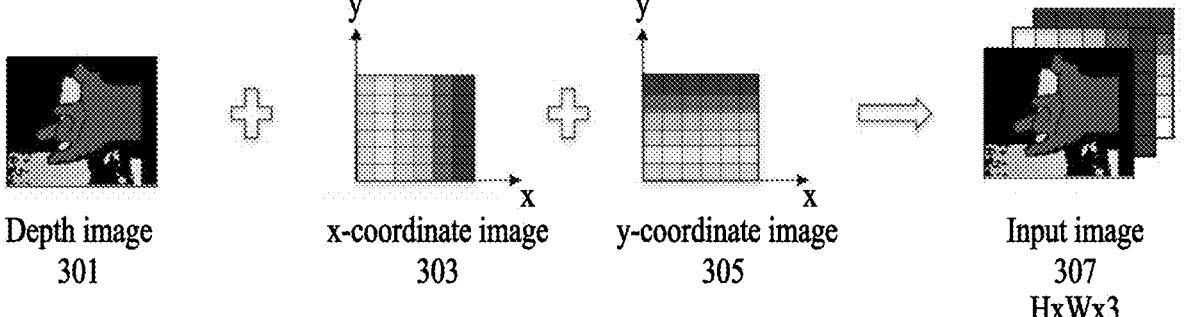
FIG. 3 illustrates example input image, according to one or more embodiments.

FIG. 3 illustrates an example input image, according to one or more embodiments.

Referring to FIG. 3, an input image 307 is illustrated. The input image 307 may include a depth image 301, an x-coordinate image 303, and a y-coordinate image 305. In other words, the input image 307 may have three channels. The x-coordinate image 303 and the y-coordinate image 305 may correspond to the depth image 301 (e.g., may be captured at or around the same time as the depth image 301). Here, a width and a height (dimensions) of each of the x-coordinate image 303 and the y-coordinate image 305 may be equal to a width and a height (dimensions) of the depth image 301.

In other words, the input image 307 may include the depth image 301 having a depth value d(i,j) normalized to [−1, 1]. The input image 307 may include the x-coordinate image 303 having an x-coordinate value u(i,j) generated according to Equation 1. The input image 307 may include the y-coordinate image 305 having a y-coordinate value v(i,j) generated according to Equation 1.

$$u(i, j) = \frac{i}{W}, j \in [0, W), i \in [0, H) \qquad \text{Equation 1}$$

$$v(i, j) = \frac{j}{H}, j \in [0, W), i \in [0, H)$$

In Equation 1, H denotes a height of an input image. W denotes a width of the input image. In addition, i and j denote a row number and a column number of a pixel point, respectively.

In other words, the x-coordinate image 303 may be an image normalized by the width of the depth image 301. The y-coordinate image 305 may be an image normalized by the height of the depth image 301. As may be seen, the pixels/values of the x-coordinate image 303 and the y-coordinate image 305 may be ratios of their distances from their corresponding axes relative to the dimensions of the input image.

Since the input image 307 includes the x-coordinate image 303 and the y-coordinate image 305 as well as the depth image 301, a larger amount of spatial information may be obtained in a process of predicting a pose. Thus, the accuracy of pose prediction may be enhanced.

According to an example, an input image with three channels may be obtained by copying a depth image three times and combining images obtained by copying the depth image.

Figure 4:
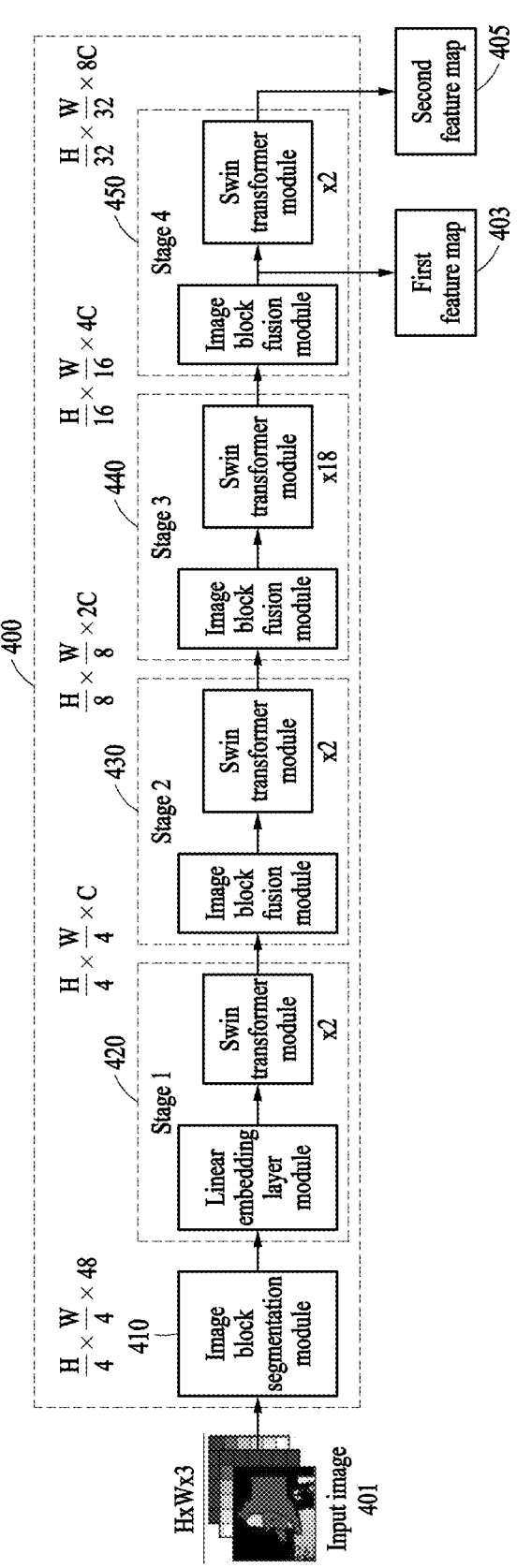
FIG. 4 illustrates an example of outputting a feature map, according to one or more embodiments.

FIG. 4 illustrates an example of outputting a feature map, according to one or more embodiments.

Referring to FIG. 4, a transformer 400 is illustrated. A processor may input an input image 401 to the transformer 400. The transformer 400 may extract a feature map from the input image 401. In some embodiments, the transformer 400 may be implemented as a neural network model (e.g., a recurrent neural network model).

The transformer 400 may learn an attention relationship between feature pixels and generate a global correlation between the feature pixels.

The transformer 400 may include an image block segmentation module 410, and stage 1 420, stage 2 430, stage 3 440, and stage 4 450 for extracting features.

The image block segmentation module 410 may segment an input image into a plurality of image blocks having a size of "4×4", for example. Each of the image blocks may also be referred to as a "token". Accordingly, a total of "H/4× W/4" tokens may be obtained. Subsequently, correlations between the tokens may be learned through four stages. The magnitudes and ratios of the dimensions mentioned with reference to FIG. 4 are only examples. The magnitudes and ratios may be readily varied as needed.

Specifically, first, the transformer 400 may segment the input image 401 with three channels into 4×4 image blocks having "48" channel features obtained by "4×4×3". Each of the image blocks may be regarded as a token, which may pass through the four stages 420, 430, 440, and 450.

For example, stage 1 420 may include one linear embedding layer module, and two swin transformer modules. The linear embedding layer module may map feature dimensions from to 128. The swin transformer modules (arranged in series) may learn information on interaction between tokens. The swin transformer modules may each include a normalization layer (LayerNorm), a multi-head self-attention layer-based shift window, two multi-layer perception layers, and a residual connection structure. A feature map output by the stage 1 420 may have a size of "H/4×W/4×C". Here, H, W, and C may be a height, a width, and a channel of the feature map, respectively.

Stage 2 430 may include one image block fusion module, and two swin transformer modules. The image block fusion module may merge adjacent tokens. Accordingly, the number of tokens output by the block fusion module may be "H/8×W/8", and an output channel of each token may be 2C. Thus, a feature map output by the stage 2 430 may have a size of "H/8×W/8×2C".

Stage 3 440 may include one image block fusion module, and "18" swin transformer modules. Accordingly, a feature map output by the stage 3 440 may have a size of "H/16× W/16×4C". The stage 4 450 may include one image block fusion module, and two swin transformer modules. Accordingly, a feature map output by the stage 4 450 may have a size of "H/32×W/32×8C".

In stage 4 450, a first feature map 403 and a second feature map 405 may be outputted for each input. The first feature map 403 may be an intermediate output of stage 4 450 and may be an output of the image block fusion module of stage 4 450. The second feature map 405 may be a final output of the two swin transformer modules of stage 4 450. Here, both the first feature map 403 and the second feature map 405 may have a size of "H/32×W/32×8C". The first feature map 403 may include a larger amount of local information (detailed information) than the second feature map 405. The second feature map 405 may include a larger amount of global information than the first feature map 403.

The first feature map 403 and the second feature map 405 may be transferred to an ordinal regression model for prediction of a joint point.

Figure 5:
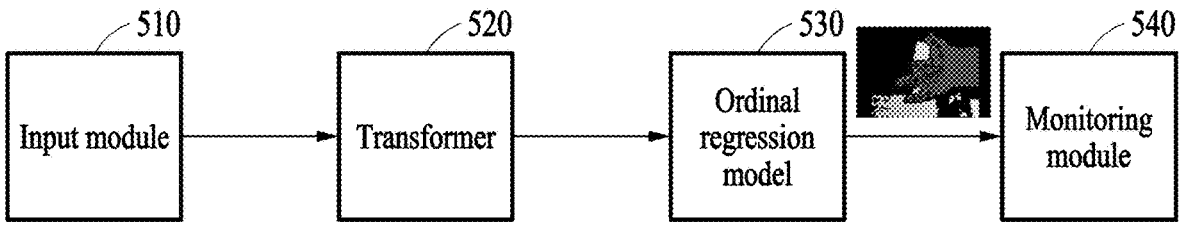
FIG. 5 illustrates an example structure of a network based on a transformer and an ordinal regression model, according to one or more embodiments.

FIG. 5 illustrates an example structure of a network based on a transformer and an ordinal regression model, according to one or more embodiments. The network may include an input module 510, a transformer 520, an ordinal regression model 530, and a monitoring module 540. The monitoring module 504 may be used only in training the network.

The input module 510 may generate an input image with three channels by combining a depth image obtained by a depth sensor, and an x-coordinate image and a y-coordinate image that are generated by the method described above with reference to FIG. 3.

The transformer 520 may be a module that generates a feature map by extracting features from an input image.

The ordinal regression model 530 may generate classification feature volumes from a feature map (provided by the transformer 520), and may do so using a pixel-wise ordinal regression scheme. The classification feature volumes may include an x classification feature volume, a y classification feature volume, and a z classification feature volume. The ordinal regression model 530 may predict coordinates of a joint point from the classification feature volumes. The ordinal regression model 530 may predict an x-coordinate, a y-coordinate, and a z-coordinate of the joint point from the x classification feature volume, the y classification feature volume, and the z classification feature volume, respectively.

The monitoring module 540 may calculate a loss of the ordinal regression model 530. The loss may include a joint point loss, and a pixel-wise ordinal regression loss. The joint point loss may be a loss for predicted coordinates of a joint point. The pixel-wise ordinal regression loss may be a loss for an x classification feature volume, a y classification feature volume, and a z classification feature volume each obtained from the ordinal regression model 530. These losses are described below.

Figure 6:
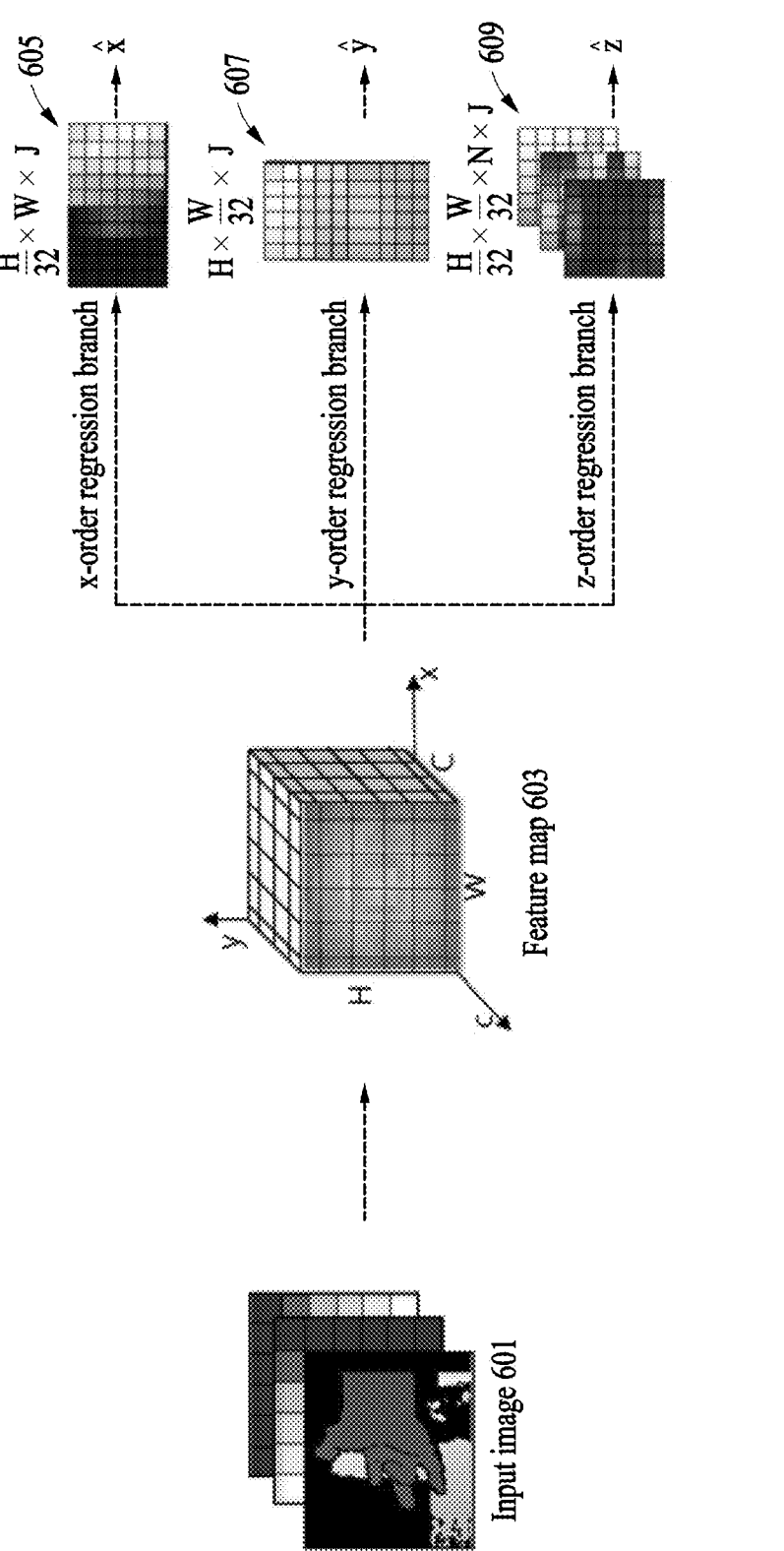
FIG. 6 illustrates a method of operating a network based on a transformer and an ordinal regression model, according to one or more embodiments.

FIG. 6 illustrates a method of operating a network based on a transformer and an ordinal regression model, according to one or more embodiments.

A processor may extract a feature map 603 from an input image 601 with three channels, using a transformer (e.g., the transformer 520). In addition, the processor may learn a correlation between feature pixels through the logic of the transformer. Thus, extracted features may be used to capture global environmental information. For example, the transformer may use a swin transformer module that is a visual transformer. A method by which the processor extracts the feature map 603 from the input image 601 using the transformer has been described above with reference to FIG. 4, and thus further description thereof is not repeated herein.

The processor may transfer the obtained feature map 603 to a pixel-wise ordinal regression model. The processor may predict an x-coordinate, a y-coordinate, and a z-coordinate of a joint point from the obtained feature map 603, using the ordinal regression model.

In other words, the processor may generate an x classification feature volume, a y classification feature volume, and a z classification feature volume from the feature map 603 through an x-order regression branch, a y-order regression branch, and a z-order regression branch, using the ordinal regression model, as shown in FIG. 6. In addition, the processor may predict the x-coordinate, the y-coordinate, and the z-coordinate of the joint point from the x classification feature volume, the y classification feature volume, and the z classification feature volume, respectively, using the ordinal regression model.

Here, each element value of each of the x classification feature volume, the y classification feature volume, and the z classification feature volume may represent a corresponding predicted probability of being a joint point. Each element's x-coordinate, y-coordinate, and z-coordinate may represent a respective probability of the joint point being greater than each of an x-coordinate, a y-coordinate, and a z-coordinate of a corresponding sampling point. The processor may predict coordinates of the joint point based on the probabilities. Specifically, the processor may use the ordinal regression model to predict the coordinates of the joint point.

For example, in the x-ordinal regression branch, the processor may divide an x-coordinate range [0, W] of an input image into "W" classification intervals (also referred to as "sampling intervals") (e.g., $[x_0, x_1), \ldots, [x_{W-1}, x_W)$), using the ordinal regression model. The processor may obtain a probability of the x-coordinate of the joint point being greater than a lower bound (e.g., $x_0, x_1, \ldots, w_{W-1}$) of the classification intervals, using the ordinal regression model. The processor may obtain x(i), which may be calculated as shown in Equation 2 below, by multiplying the probability by a classification interval length $(x_{k+1}-x_k)$ corresponding to probabilities of "W" binary classifications and summing multiplication results, using the ordinal regression model. The processor may finally obtain a predicted x-coordinate value of the joint point by obtaining an average for x(i). A predicted y-coordinate value and a predicted z-coordinate value of the joint point may be obtained in a similar manner.

$$x(i) = \sum_{k=0}^{W-1} p(x(i, k) \geq x_k) \cdot (x_{k+1} - x_k) \qquad \text{Equation 2}$$

In Equation 2, $x_k$ denotes a lower bound of a k-th classification interval, and $x_{k+1}$ denotes a lower bound of a (k+1)-th classification interval.

In a training operation of a neural network, a monitoring module may calculate a loss using a joint point, the x classification feature volume, the y classification feature volume, and the z classification feature volume. In particular, the monitoring module may calculate a pixel-wise ordinal regression loss using each pixel of the x classification feature volume, the y classification feature volume, and the z classification feature volume. In the training operation of the neural network, the accuracy of prediction of a joint point may be enhanced based on the loss. This is described below.

Hereinafter, an example in which the processor predicts a joint point by obtaining classification feature volumes from a feature map and performing ordinal regression using an ordinal regression model is described in detail.

Figure 7:
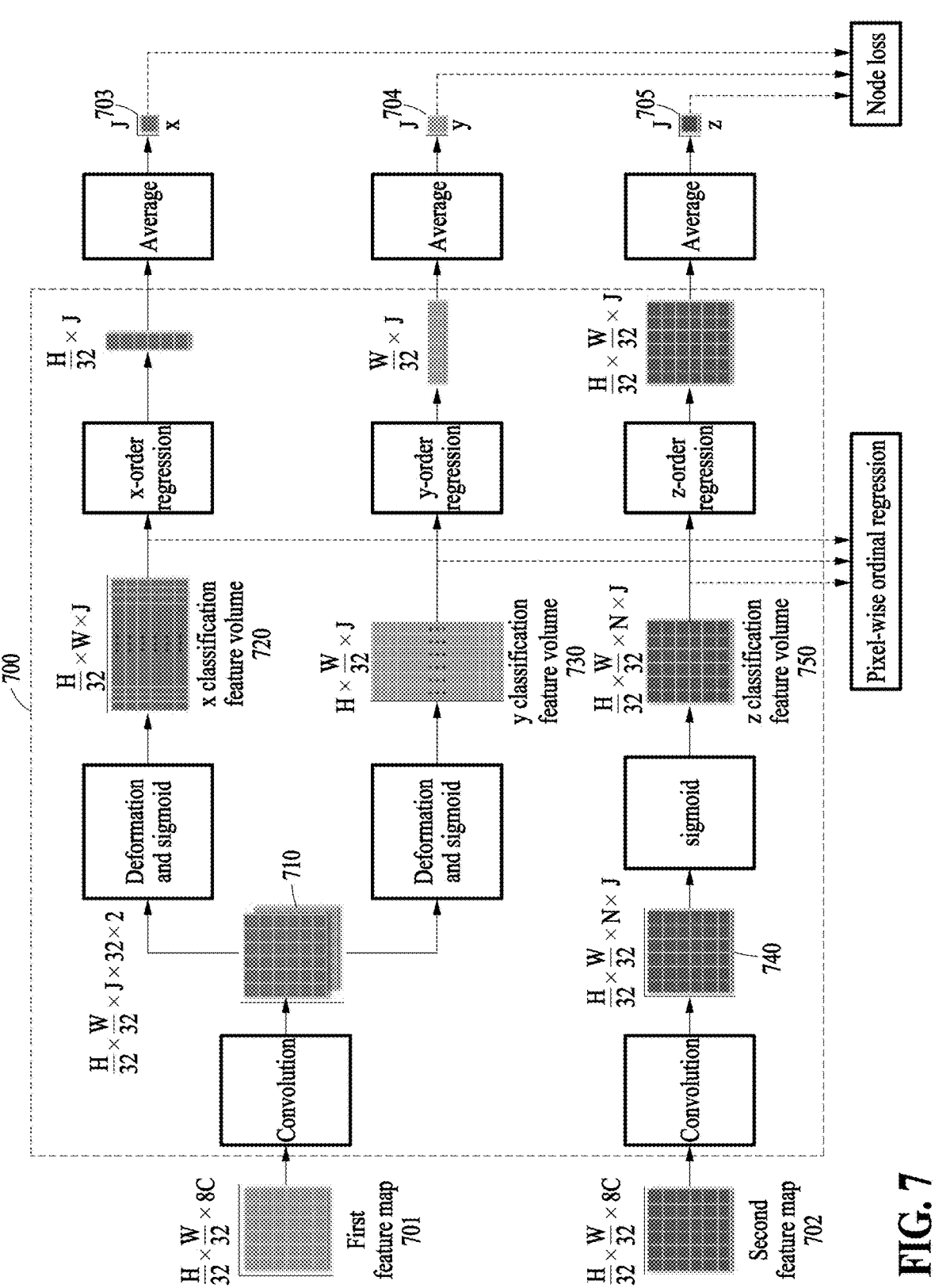
FIG. 7 illustrates an example operation of an ordinal regression model, according to one or more embodiments.

FIG. 7 illustrates an example operation of an ordinal regression model, according to one or more embodiments.

A processor may input a first feature map 701 (e.g., first feature map 403) and a second feature map 702 (e.g., second feature map 405) to an ordinal regression model 700 (e.g., ordinal regression model 530). The first feature map 701 and the second feature map 702 may have a size of "H/32×W/32×8C", as described above with reference to FIG. 4. The processor may generate a classification feature volume using the ordinal regression model 700.

Specifically, the ordinal regression model 700 may obtain first sampling points by performing discretized sampling on a width of an input image, to generate an x classification feature volume 720 from the first feature map 701. The discretized sampling may be average discretized sampling. The ordinal regression model 700 may generate the x classification feature volume 720 of each joint point by, as shown in FIG. 7, sequentially performing convolution, size deformation, and binary classification on the first feature map 701 based on x-coordinates of the first sampling points.

The ordinal regression model 700 may obtain second sampling points by performing discretized sampling on a height of the input image, to generate a y classification feature volume 730 from the first feature map 701. The discretized sampling may be average discretized sampling.

The ordinal regression model 700 may generate the y classification feature volume 730 of each joint point by, as shown in FIG. 7, sequentially performing convolution, size deformation, and binary classification on the first feature map 701 based on y-coordinates of the plurality of second sampling points.

Hereinafter, a method of generating the x classification feature volume 720 is mainly described. However, since the method of generating the y classification feature volume 730 is similar to the method of generating the x classification feature volume 720, the y classification feature volume 730 may be generated based on the following description.

Referring to FIG. 7, the ordinal regression model 700 may transform a feature dimension 8C to "J×32×2" by performing a convolution on the first feature map 701. Here, J may represent the number of joint points. Regarding how J may be obtained, the number of joint points (J) may be obtained by various known methods, for example using a neural network model, using any previous image-processing algorithms, and the like. A new first feature map 710 that is generated may be divided into two parts (according to the x and y dimensions). The two parts may be transformed to the x classification feature volume 720 and the y classification feature volume 730, respectively, through respective size deformation and sigmoid modules (i.e., binary classifications).

The x classification feature volume 720 and the y classification feature volume 730 may have a size of "H/32×W×J" and a size of "H×W/32×J", respectively. The x classification feature volume 720 may include multiple x classification feature maps, and each of the x classification feature maps may have a size of "H/32×W". Accordingly, the x classification feature volume 720 may include "J" x classification feature maps corresponding to the number of joint points. Similarly, the y classification feature volume 730 may include multiple y classification feature maps, and each of the y classification feature maps may have a size of "H×W/32". Accordingly, the y classification feature volume 730 may include "J" y classification feature maps corresponding to the number of joint points. An element value of a classification feature volume may represent a binary classification probability. That is, the values of the elements may represent respective binary classification probabilities.

In other words, if x-coordinates of an input image are sampled using average discretized sampling, sampling intervals (also referred to as "classification intervals") may include $[x_0, x_1)$ through $[x_{W-1}, x_W)$. Here, an element value of an x classification feature volume may represent a probability $p(x \geq x_k)$ of an x-coordinate of a joint point being greater than a lower bound of each sampling interval (first sampling point). Here, $x_k$ may be an x-coordinate of a k-th first sampling point.

In addition, the ordinal regression model 700 may obtain third sampling points by performing discretized sampling on a depth of the input image, to generate a z classification feature volume 750 from the second feature map 702. The discretized sampling may be normal discretized sampling. In the normal discretized sampling, the closer to the center, the lower the sampling interval, and the closer to both sides, the greater the sampling interval. The ordinal regression model 700 may generate the z classification feature volume 750 for each joint point by sequentially performing convolution and binary classification on the second feature map 702 based on z-coordinates of the plurality of third sampling points.

Specifically, referring to FIG. 6, the ordinal regression model 700 may transform a feature dimension of quantity 8C to a feature dimension of quantity "J×N" by performing a convolution on the second feature map 702. A new second feature map 740 that is thus generated may be transformed to the z classification feature volume 750 through a sigmoid function (i.e., binary classification). The z classification feature volume 750 may have a size of "H/32×W/32×J×N". N represents the classification number of z-coordinates. The z classification feature volume 750 may include a plurality of z classification feature maps, and each of the z classification feature maps may have a size of "H/32×W/32×N". Accordingly, the z classification feature volume 750 may include "J" z classification feature maps respectively corresponding to the number of joint points.

An element value of the z classification feature volume 750 may represent a binary classification probability.

In other words, if z-coordinates of the input image are sampled using normal discretized sampling, sampling intervals (also referred to as "classification intervals") may include $[z_0, z_1)$ through $[z_{W-1}, z_W)$. Here, an element value of a z classification feature volume may represent a probability of a z-coordinate of a joint point being greater than each sampling interval (third sampling point). Here, z k may be a z-coordinate of a k-th third sampling point.

The processor may predict coordinates of a joint point using classification feature volumes obtained based on the above-described method. The processor may obtain a predicted x-coordinate value 703 based on the x classification feature volume 720, a predicted y-coordinate value 704 based on the y classification feature volume 730, and a predicted z-coordinate value 705 based on the z classification feature volume 750. A method of predicting coordinates of a joint point from classification feature volumes is described with reference to FIGS. 11 to 14.

In addition, the processor may calculate a loss using a classification feature volume. The processor may calculate the loss using predicted coordinates of a joint point and known (ground truth) coordinates of the joint point. The calculated loss may be used in training the network, and thus, the accuracy of the network may be enhanced.

Figure 8:
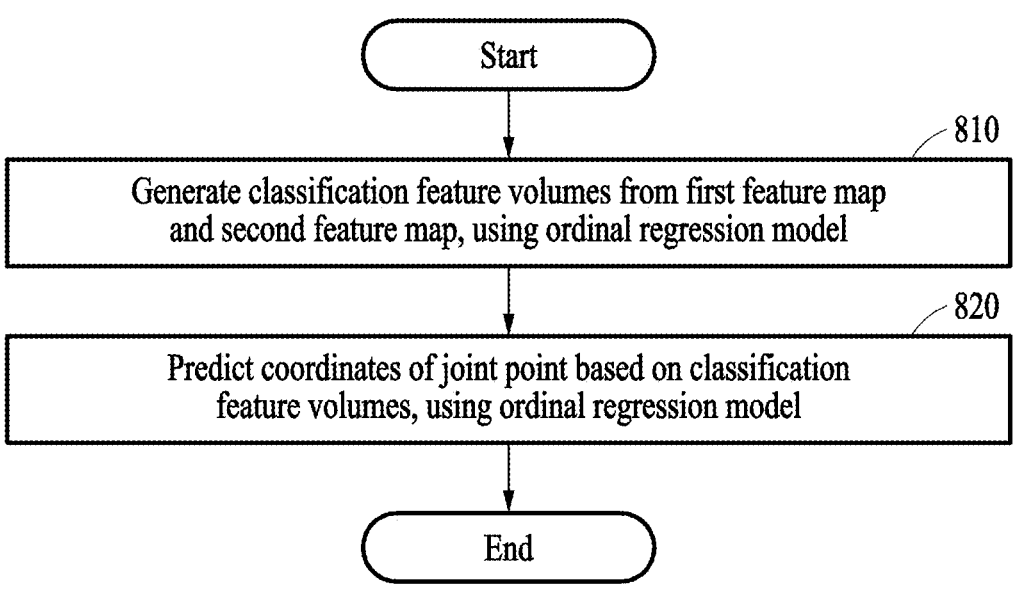
FIG. 8 illustrates an example of predicting coordinates of a joint point, according to one or more embodiments.

FIG. 8 illustrates an example of predicting coordinates of a joint point, according to one or more embodiments.

In operation 810, a processor may generate classification feature volumes from a first feature map and a second feature map, using an ordinal regression model.

The classification feature volumes may include an x classification feature volume, a y classification feature volume, and a z classification feature volume. The processor may generate an x classification feature volume and a y classification feature volume from the first feature map, and may do so using the ordinal regression model. The processor may generate the x classification feature volume and the y classification feature volume by performing convolution, size deformation, and sigmoid operations on the first feature map, and may do so using the ordinal regression model.

The processor may generate a z classification feature volume from the second feature map using the ordinal regression model. The processor may generate the z classification feature volume by performing convolution and sigmoid on the second feature map.

In operation 820, the processor may predict coordinates of a joint point based on the classification feature volumes, and may do so using the ordinal regression model.

The processor may obtain a predicted x-coordinate value, a predicted y-coordinate value, and a predicted z-coordinate value of the joint point, based on the x classification feature volume, the y classification feature volume, and the z classification feature volume, respectively, using the ordinal regression model.

Figure 9:
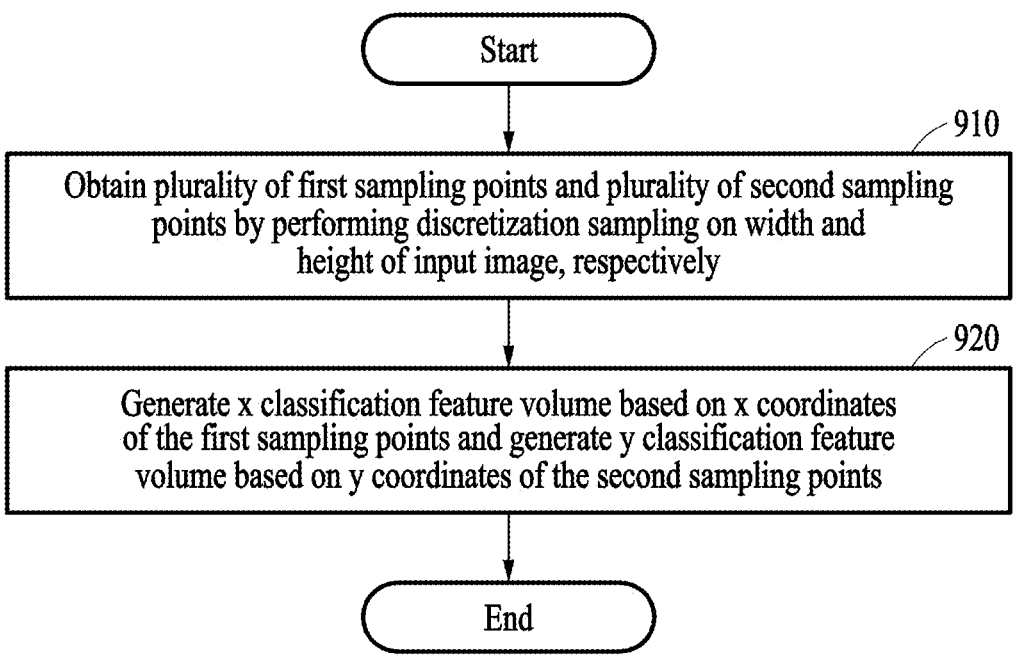
FIGS. 9 and 10 illustrate examples techniques for generating classification feature volumes, according to one or more embodiments.
Figure 10:
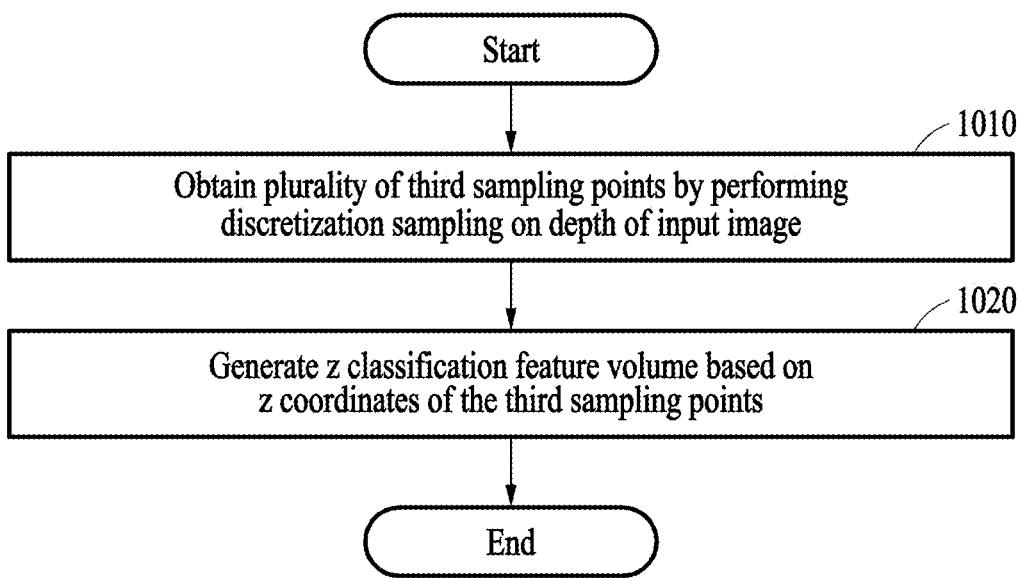

FIGS. 9 and 10 illustrate example techniques for generating classification feature volumes, according to one or more embodiments.

FIG. 9 illustrates an example in which a processor generates an x classification feature volume and a y classification feature volume.

In operation 910, the processor may obtain first sampling points and second sampling points by performing discretized sampling on a width dimension (or channel) and a height dimension (or channel) of an input image, respectively.

The processor may obtain the first sampling points by performing average discretized sampling over the width dimension of the input image. The processor may obtain the second sampling points by performing average discretized sampling over the height dimension of the input image.

In operation 920, the processor may generate an x classification feature volume based on x-coordinates of the first sampling points and may generate a y classification feature volume based on y-coordinates of the second sampling points.

The processor may generate x classification feature volumes of respective joint points by sequentially performing convolution, size deformation, and binary classification on a first feature map based on the x-coordinates of the first sampling points. The processor may generate y classification feature volumes for the respective joint points by sequentially performing convolution, size deformation, and binary classification on the first feature map based on the y-coordinates of the second sampling points.

FIG. 10 illustrates an example in which the processor generates a z classification feature volume, according to one or more embodiments.

In operation 1010, the processor may obtain third sampling points by performing discretized sampling on a depth dimension of the input image.

The processor may obtain the third sampling points by performing normal discretized sampling on the depth dimension of the input image.

In operation 1020, the processor may generate a z classification feature volume based on z-coordinates of the third sampling points.

The processor may generate a z classification feature volume of each joint point by sequentially performing convolution and binary classification operations on a second feature map based on the third sampling points.

Next, an example of predicting coordinates of a joint point using classification feature volumes is described.

Figure 11:
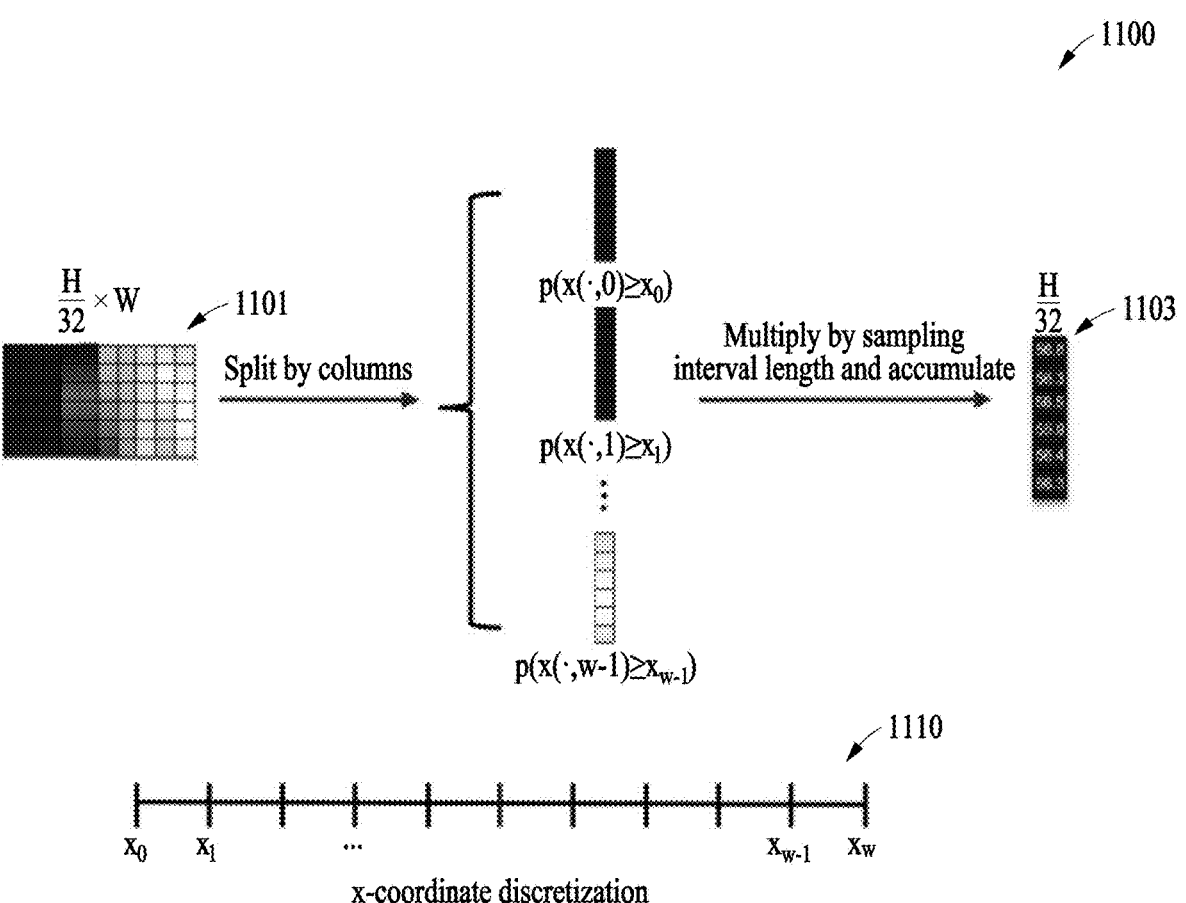
FIGS. 11 to 13 illustrate an example of obtaining a predicted x-coordinate value from an x classification feature volume and an example of obtaining a predicted y-coordinate value from a y classification feature volume, according to one or more embodiments.
Figure 12:
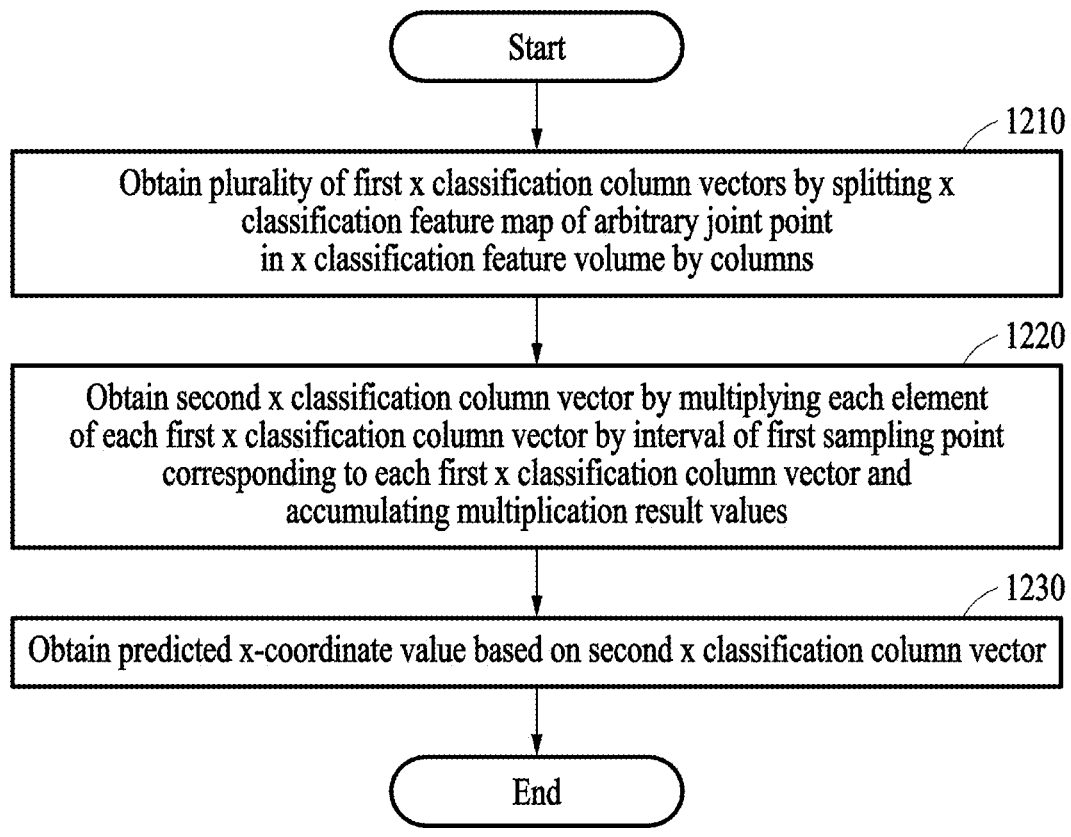
Figure 13:
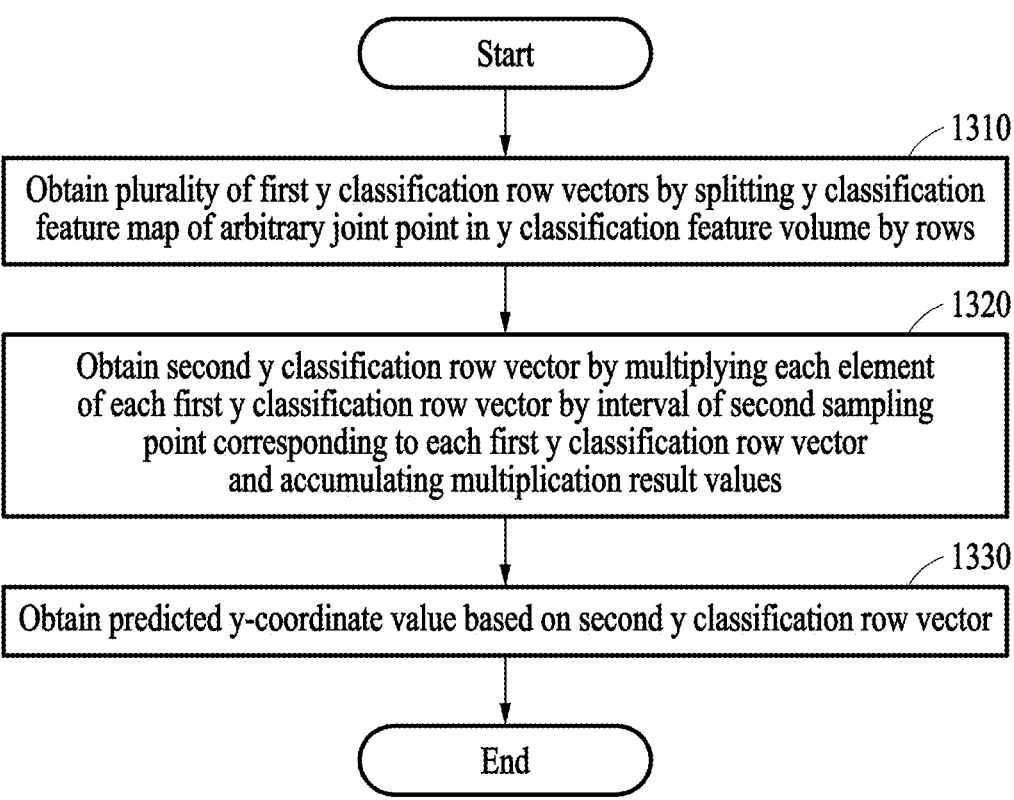

FIGS. 11 to 13 illustrate an example of obtaining a predicted x-coordinate value from an x classification feature volume and an example of obtaining a predicted y-coordinate value from a y classification feature volume, according to one or more embodiments.

FIG. 11 illustrates an example 1100 of generating first x classification column vectors from an x classification feature map 1101 and generating a second x classification column vector from the first x classification column vectors. The x classification feature map 1101 may be a map of an arbitrary joint point included in an x classification feature volume.

In this example, a processor may generate the first x classification column vectors and the second x classification column vector using an ordinal regression model. The processor may predict an x-coordinate of the joint point based on the second x classification column vector.

For example, the x classification feature map 1101 may be split, column-wise, into the first x classification column vectors. Since the size of the x classification feature map 1101 is "H/32×W", there may be "W" first x classification column vectors.

In this example, each element of each of the first x classification column vectors may represent a probability that the x-coordinate of the element is greater than a hypothetical x-coordinate of a first sampling point corresponding to the element when the joint point is at a pixel point corresponding to a y-coordinate of the element. That is, for any given element of any given column vector, the value of the given element may represent the probability that the x-coordinate of the given element is greater than a hypothetical x-coordinate of a first sampling point that corresponds to the given element when the joint point is at the y-coordinate of the given element.

When the x classification feature map 1101 is split into the first x classification column vectors, each element of each of the vectors may be multiplied by a corresponding first sampling interval length. In addition, results of such multiplications for the same row may be accumulated, and the accumulation may become an element of a second x classification column vector 1103. Accordingly, the second x classification column vector 1103 may be generated.

For example, an element value $p(x(0, k) \geq x_k)$ of a first row (a single element) of the plurality of first x classification column vectors may be multiplied by a first sampling interval length $(x_{k+1} - x_k)$ and a multiplication result may be accumulated. Thus, an element $x(0)$ of a first row of a second x classification column vector may be calculated. In other words, Equation 2 described above may be calculated for each element of each of the first x classification column vectors.

As a result, the second x classification column vector 1103 may be generated by multiplying each of the plurality of first x classification column vectors by the first sampling interval length and accumulating respective multiplication results.

Average discretized sampling 1110 may be used for a width dimension (i.e., x-coordinates) of an input image when the x classification feature volume is generated (as described with reference to FIG. 9), and thus sampling intervals may be the same. In particular, a sampling interval of the width dimension (i.e., x-coordinates) of the input image and of the height dimension (i.e., y-coordinates) of the input image may be one pixel.

Finally, the processor may calculate an average of the elements of the second x classification column vector 1103 and thereby obtain a predicted x-coordinate value of the joint point in the x classification feature map 1101 (which is the basis of the second x classification column vector 1103).

Using the above-described method, predicted x-coordinate values for all joint points may be obtained.

Although first y classification row vectors are generated by splitting the y classification feature map by rows and by multiplication by a second sampling interval length is performed for obtaining a predicted y-coordinate value of a joint point based on the y classification feature map, the method of obtaining the predicted y-coordinate value of the joint point based on the y classification feature map is otherwise similar to the method of obtaining a predicted x-coordinate value of a joint point based on an x classification feature map (with splitting, etc. being performed on rows rather than columns).

Next, an example of obtaining a predicted x-coordinate value and a predicted y-coordinate value of a joint point is described with reference to FIGS. 12 and 13.

FIG. 12 illustrates an example of obtaining a predicted x-coordinate value of a joint point from an x classification feature volume, according to one or more embodiments.

In operation 1210, a processor may obtain first x classification column vectors by column-wise splitting an x classification feature map of an arbitrary joint point in the x classification feature volume.

In operation 1220, the processor may obtain a second x classification column vector by multiplying each element of each of the first x classification column vectors by an interval of a first sampling point corresponding to each of the first x classification column vectors and accumulating multiplication result values. Multiplication result values corresponding to the same column may be accumulated for each column.

The processor may perform operations 1210 and 1220 using an ordinal regression module.

In operation 1230, the processor may obtain a predicted x-coordinate value of a joint point based on the second x classification column vector.

More specifically, the processor may obtain the predicted x-coordinate value by determining an average of the elements of the second x classification column vector.

FIG. 13 illustrates an example of obtaining a predicted y-coordinate value of a joint point from a y classification feature volume, according to one or more embodiments.

In operation 1310, the processor may obtain first y classification row vectors by row-wise splitting a y classification feature map of an arbitrary joint point in the y classification feature volume.

In operation 1320, the processor may obtain a second y classification row vector by multiplying each element of each of the first y classification row vectors by an interval of a second sampling point corresponding to each element and accumulating multiplication result values. Multiplication result values corresponding to the same row may be accumulated for each row.

The processor may perform operations 1310 and 1320 using an ordinal regression module.

In operation 1330, the processor may obtain a predicted y-coordinate value of the joint point based on the second y classification row vector.

More specifically, the processor may obtain the predicted y-coordinate value of the joint point by determining an average of the elements of the second y classification row vector.

Figure 14:
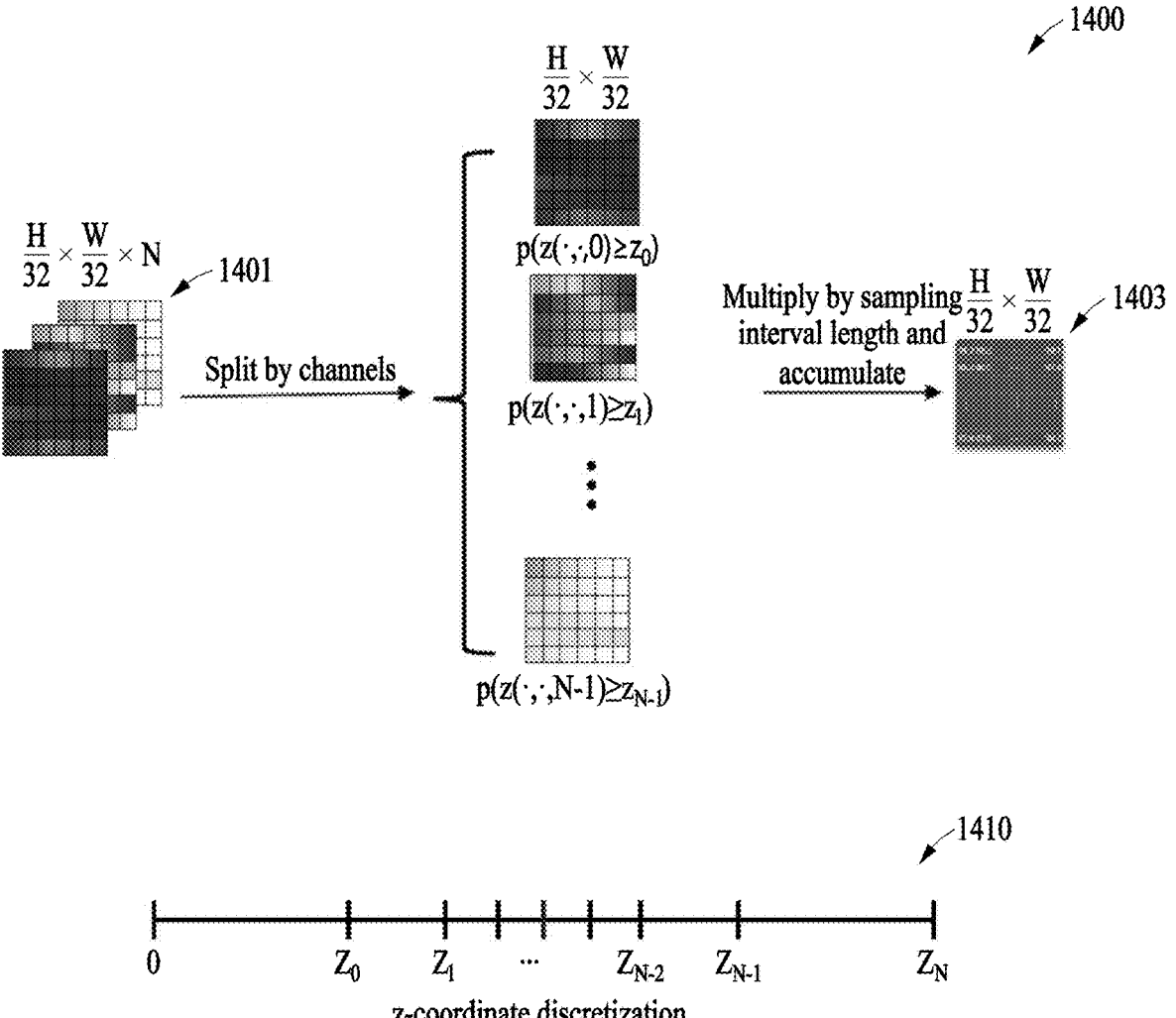

FIGS. 14 and 15 illustrate an example of obtaining a predicted z-coordinate value from a z classification feature volume, according to one or more embodiments.

FIG. 14 illustrates an example 1400 of generating first z classification matrices and a second z classification matrix 1403 from a z classification feature map 1401 of an arbitrary joint point included in a z classification feature volume.

In this example, a processor may generate the first z classification matrices and the second z classification matrix 1403 using an ordinal regression model. The processor may predict a z-coordinate of a joint point based on the second z classification matrix 1403.

Specifically, when the size of the z classification feature volume is "H/32×W/32×N×J", for example, the size of the z classification feature map 1401 of the arbitrary joint point may be "H/32×W/32×N". The z classification feature map 1401 may be split by channels. Accordingly, the z classification feature map 1401 may be split into "N" first z classification matrices.

Here, each element of each of the first z classification matrices may represent a probability of a corresponding z-coordinate being greater than a hypothetical z-coordinate of a third corresponding sampling point when the joint point is at a corresponding pixel point. In other words, each element may represent $p(z(i, j, k) \geq z_k)$.

Subsequently, each element of each of the first z classification matrices may be multiplied by a corresponding third sampling interval length $(z_{k+1} - z_k)$. In addition, multiplication results for the same position may be accumulated. Thus, a second z classification matrix may be generated.

For example, an element value $p(z(1,1, k) \geq z_k)$ at (1, 1) of the plurality of first z classification matrices may be multiplied by a third sampling interval length $(z_{k+1} - z_k)$ and the multiplication results may be accumulated. Accordingly, an element z(1,1) at (1,1) of the second z classification matrix may be calculated. In other words, Equation 3 may be calculated for each element of the plurality of first z classification matrices.

$$z(i, j) = \sum_{k=0}^{N-1} p(z(i, j, k) \geq z_k) \cdot (z_{k+1} - z_k) \qquad \text{Equation 3}$$

As a result, the second z classification matrix 1403 may be generated by multiplying each of the first z classification matrices by the third sampling interval length and accumulating the multiplication results.

Normal discretized sampling 1410 may be used for a depth dimension/channel (i.e., z-coordinates) of an input image when the z classification feature volume is generated as described above with reference to FIG. 10, and thus third sampling interval lengths may be different. That is, the third sampling interval lengths may decrease toward the matrices' centers and may increase towards the matrices' horizontal and vertical sides. In other words, the third sampling interval length may be d, d/2, d/2, d/4, . . . , d/4, d/2, d/2, d.

Finally, the processor may calculate an average value of the element of the second z classification matrix 1403 to obtain a predicted z-coordinate value of the joint point in the z classification feature map 1401 (which is the basis of the second z classification matrix 1403).

The processor may calculate predicted x-coordinate values, predicted y-coordinate values, and predicted z-coordinate values of multiple respective joint points of joints represented/captured in an input image, as described with reference to FIGS. 11 to 14, and may predict a pose of an object based on the predicted joint points. Known pose prediction techniques may be used.

FIG. 15 illustrates an example of obtaining a predicted z-coordinate value of a joint point from a z classification feature volume, according to one or more embodiments.

In operation 1510, a processor may obtain first z classification matrices by splitting a z classification feature map of an arbitrary joint point in the z classification feature volume by channels.

In operation 1520, the processor may obtain a second z classification matrix by multiplying each element of each of the first z classification matrices by an interval of a third sampling point corresponding to each of the first z classification matrices and accumulating corresponding multiplication result values.

The processor may perform operations 1510 and 1520 using an ordinal regression module.

In operation 1530, the processor may obtain a predicted z-coordinate value based on the second z classification matrix.

The processor may obtain an average value for each element of the second z classification matrix as a predicted z-coordinate value of the joint point.

Hereinafter, an example of calculating a loss in a training operation of a network to enhance the accuracy of prediction of a joint point is described.

Figure 16:
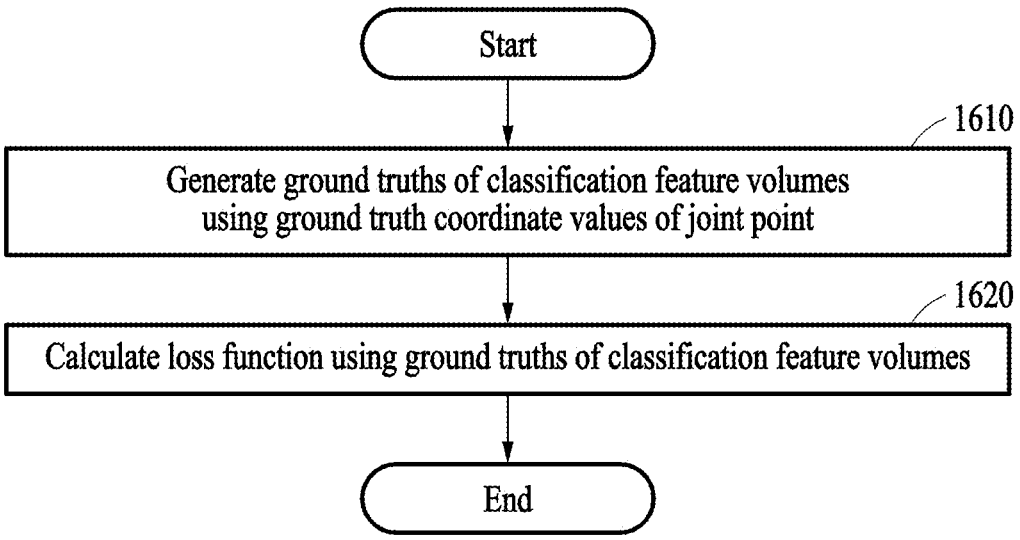
FIG. 16 illustrates an example of calculating a loss in a training operation of a network, according to one or more embodiments.

FIG. 16 illustrates an example of calculating a loss in a training operation of a network, according to one or more embodiments.

In the training operation of the network, a monitoring module may be used to monitor a joint point, an x classification feature volume, a y classification feature volume, and a z classification feature volume which are obtained. In particular, a pixel-wise ordinal regression loss that is a result of monitoring the x classification feature volume, the y classification feature volume, and the z classification feature volume may help in learning features by monitoring pixels of classification feature volumes. As a result, the accuracy of prediction of a joint point may be enhanced.

In operation 1610, the processor may generate or access ground truths of classification feature volumes using ground truth coordinate values of a joint point.

If only the ground truth coordinate values of the joint point are present, the ground truths of the classification feature volumes may be generated first. In other words, based on the ground truth coordinate values of the joint point, a ground truth of a corresponding x classification feature volume, a ground truth of a corresponding y classification feature volume, and a ground truth of a corresponding z classification feature volume may each be generated.

An element of a classification feature volume may represent a probability that a corresponding coordinate value of a joint point is greater than a corresponding coordinate value of a corresponding sampling point. Here, if a ground truth coordinate value of the joint point is greater than or equal to the corresponding sampling point, the classification result may be "1", and otherwise, the classification result may be "0". Thus, a ground truth of each classification feature volume may be generated according to Equation 4.

$$F_x^{gt}(y, k, j) = \begin{cases} 1, & \text{if } x_j^{gt} \geq x_k \\ 0, & \text{if } x_j^{gt} < x_k \end{cases}$$

$$F_y^{gt}(k, x, j) = \begin{cases} 1, & \text{if } y_j^{gt} \geq y_k \\ 0, & \text{if } y_j^{gt} < y_k \end{cases}$$

$$F_z^{gt}(y, x, k, j) = \begin{cases} 1, & \text{if } d_j^{gt} \geq z_k \\ 0, & \text{if } d_j^{gt} < z_k \end{cases}$$

Equation 4

In Equation 4, $x_k$, $y_k$, and $z_k$ denote sampling points having x-coordinates, y-coordinates, and z-coordinates that are within a range of values. In addition, k denotes a serial number of a corresponding sampling point. Terms $$F_x^{gt}(y, x_i, j), F_y^{gt}(y_i, x, j), \text{ and } F_z^{gt}(y, x, d_i, j)$$

that are generated may be ground truths of an x classification feature volume, a y classification feature volume, and a z classification feature volume, respectively. In operation 1620, the processor may calculate a loss function using the ground truths of these classification feature volumes.

Loss functions of the x classification feature volume, the y classification feature volume, and the z classification feature volume may be calculated using a cross entropy loss function based on the generated ground truths of the x classification feature volume, the y classification feature volume, and the z classification feature volume.

The loss function of the x classification feature volume implemented with code that is configured as described by Equation 5. The loss function of the y classification feature volume may be similarly implemented with code described by Equation 5, but as modified for application to the y classification feature volume.

$$L_{ordinal}\left(F_x^{pred}, F_x^{gt}\right) =$$

$$\frac{1}{\frac{H}{32} \times W \times J} \sum_{y=0}^{\frac{H}{32}-1} \sum_{x=0}^{W-1} \sum_{j=0}^{J-1} -\left[F_x^{gt}(y, x, j)\log\left(F_x^{pred}(y, x, j)\right) + \right.$$

$$\left. (1 - F_x^{gt}(y, x, j))\log\left(1 - F_x^{pred}(y, x, j)\right)\right]$$

Equation 5

The loss function of the z classification feature volume may be expressed as in Equation 6.

$$L_{ordinal}\left(F_z^{pred}, F_z^{gt}\right) = \frac{1}{\frac{H}{32} \times W \times N \times J} \sum_{y=0}^{\frac{H}{32}-1} \sum_{x=0}^{\frac{W}{32}-1} \sum_{z=0}^{N-1} \sum_{j=0}^{J-1} -$$

$$\left[F_z^{gt}(y, x, z, j)\log\left(F_z^{pred}(y, x, z, j)\right) + \right.$$

$$\left. (1 - F_z^{gt}(y, x, z, j))\log\left(1 - F_z^{pred}(y, x, z, j)\right)\right]$$

Equation 6

In conclusion, a pixel-wise ordinal regression loss function may be defined as in Equation 7.

$$L_{ordinal\_loss} =$$

$$L_{ordinal}\left(F_x^{pred}, F_x^{gt}\right) + L_{ordinal}\left(F_y^{pred}, F_y^{gt}\right) + L_{ordinal}\left(F_z^{pred}, F_z^{gt}\right)$$

Equation 7

The pixel-wise ordinal regression loss function may help in learning features by monitoring pixels of classification feature volumes in the training operation of the network. As a result, the accuracy predicting joint points may be enhanced.

The computing apparatuses, the electronic devices, the processors, the memories, the image sensors, the displays, the information output system and hardware, the storage devices, and other apparatuses, devices, units, modules, and components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of operating an electronic device, the method comprising:

extracting a feature map from an input image;

predicting coordinates of a joint point from the feature map using an ordinal regression model, the joint point corresponding to a point of a joint of an object; and predicting a pose of the object using the predicted coordinates of the joint point, wherein the extracting of the feature map comprises:

inputting the input image to a transformer, and extracting from the input image, by the transformer, a first feature map that is an intermediate output of the transformer and a second feature map that is a final output of the transformer.

2. The method of claim 1, further comprising generating the input image based on a depth image of the object, wherein the generating of the input image comprises generating an x-coordinate image with respect to a width of the depth image and generating a y-coordinate image with respect to a height of the depth image.

3. The method of claim 1, wherein the predicting of the coordinates of the joint point from the feature map comprises:

generating classification feature volumes from the first feature map and the second feature map using the ordinal regression model; and predicting the coordinates based on the classification feature volumes using the ordinal regression model.

4. The method of claim 3, wherein multiple joint points, including the joint point, are predicted based on the input image, and wherein the generating of the classification feature volumes comprises:

generating an x classification feature volume and a y classification feature volume for each of the joint points based on the first feature map; and generating a z classification feature volume for each of the joint points based on the second feature map.

5. The method of claim 4, wherein the generating of an x classification feature volume and a y classification feature volume for each joint point comprises:

obtaining first sampling points and second sampling points by performing discretized sampling on a width dimension and on a height dimension of the input image, respectively; and generating the x classification feature volume based on x-coordinates of the first sampling points and generating the y classification feature volume based on y-coordinates of the second sampling points.

6. The method of claim 4, wherein the generating of the z classification feature volume comprises:

obtaining third sampling points by performing discretized sampling on a depth dimension of the input image; and generating the z classification feature volume based on z-coordinates of the third sampling points.

7. The method of claim 4, wherein the predicting of the coordinates of the joint point from the feature map comprises obtaining a predicted x-coordinate value, a predicted y-coordinate value, and a predicted z-coordinate value of the joint point, based on the x classification feature volume, the y classification feature volume, and the z classification feature volume, respectively.

8. The method of claim 7, wherein the obtaining of the predicted x-coordinate value, the predicted y-coordinate value, and the predicted z-coordinate value comprises:

obtaining first x classification column vectors by column-wise splitting an x classification feature map of an arbitrary joint point in the x classification feature volume;

obtaining a second x classification column vector by multiplying each element of each of the first x classification column vectors by an interval of a first sampling point and by accumulating result values of the multiplying; and obtaining the predicted x-coordinate value based on the second x classification column vector.

9. The method of claim 8, wherein each element of each of the first x classification column vectors represents a respective probability of an x-coordinate thereof being greater than an x-coordinate of a first sampling point corresponding to each element when the joint point is at a pixel point corresponding to a y-coordinate of each element.

10. The method of claim 7, wherein the obtaining of the predicted x-coordinate value, the predicted y-coordinate value, and the predicted z-coordinate value comprises:

obtaining first y classification row vectors by row-wise splitting a y classification feature map of an arbitrary joint point in the y classification feature volume;

obtaining a second y classification row vector by multiplying each element of each of the first y classification row vectors by an interval of a second sampling point and by accumulating result values of the multiplying; and obtaining the predicted y-coordinate value based on the second y classification row vector.

11. The method of claim 10, wherein each element of each of the first y classification row vectors represents a respective probability of a y-coordinate thereof being greater than a y-coordinate of a second sampling point corresponding to each element when the joint point is at a pixel point corresponding to an x-coordinate of each element.

12. The method of claim 7, wherein the obtaining of the predicted x-coordinate value, the predicted y-coordinate value, and the predicted z-coordinate value comprises:

obtaining first z classification matrices by splitting a z classification feature map in the z classification feature volume by channels;

obtaining a second z classification matrix by multiplying each element of each of the first z classification matrices by an interval of a third sampling point and by accumulating result values of the multiplying; and obtaining the predicted z-coordinate value based on the second z classification matrix.

13. The method of claim 12, wherein each element of each of the first z classification matrices represents a respective probability of a z-coordinate thereof being greater than a z-coordinate of a third sampling point corresponding to each element when the joint point is at a pixel point corresponding to each element.

14. A method of operating an electronic device, the method comprising:

extracting a feature map from an input image using a transformer;

generating, by an ordinal regression model, from the feature map, classification feature volumes, wherein the classification feature volumes are an intermediate output of the ordinal regression model;

predicting, based on the classification feature volumes, coordinates of a joint point, wherein the predicted coordinates are an output of the ordinal regression model; and predicting a pose of an object using the predicted coordinates of the joint point.

15. The method of claim 14, wherein the predicted coordinates are a final output of the ordinal regression model.

16. An electronic device comprising:

a processor configured to extract a feature map from an input image, predict coordinates of a joint point from the feature map using an ordinal regression model, and predict a pose of an object using the predicted coordinates of the joint point.

17. The electronic device of claim 16, wherein the processor is further configured to form the input image based on a depth image of the object, and wherein the processor is further configured to: generate an x-coordinate image normalized by a width of the depth image, generate a y-coordinate image normalized by a height of the depth image, and form the input image to include the x-coordinate image, the y-coordinate image, and the depth image.

18. The electronic device of claim 16, wherein the processor is further configured to:

input the input image to a transformer; and extract, by the transformer, from the input image, a first feature map and a second feature map.

19. The electronic device of claim 18, wherein the processor is further configured to generate classification feature volumes from the first feature map and the second feature map using the ordinal regression model, and to predict the coordinates based on the classification feature volumes using the ordinal regression model.

\* \* \* \* \*